United States Patent
Janssen et al.

(10) Patent No.: US 7,483,936 B2
(45) Date of Patent: Jan. 27, 2009

(54) CALCULATING UNIT

(75) Inventors: Norbert Janssen, Munich (DE); Tanja Roemer, Munich (DE); Holger Sedlak, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 775 days.

(21) Appl. No.: 11/080,998

(22) Filed: Mar. 14, 2005

(65) Prior Publication Data

US 2005/0210088 A1  Sep. 22, 2005

(30) Foreign Application Priority Data

Mar. 18, 2004 (DE) .................. 10 2004 013 484

(51) Int. Cl.
*G06F 7/38* (2006.01)
(52) U.S. Cl. .................. 708/513
(58) Field of Classification Search .................. 708/513
See application file for complete search history.

(56) References Cited

U.S. PATENT DOCUMENTS

| | | | | |
|---|---|---|---|---|
| 4,393,468 A * | 7/1983 | New | | 708/518 |
| 4,514,592 A * | 4/1985 | Miyaguchi | | 380/30 |
| 5,636,351 A * | 6/1997 | Lee | | 712/204 |
| 5,978,260 A * | 11/1999 | Trimberger et al. | | 365/182 |
| 6,140,839 A * | 10/2000 | Kaviani et al. | | 326/39 |
| 6,735,611 B2 * | 5/2004 | Vanstone | | 708/492 |
| 2002/0124038 A1 * | 9/2002 | Saitoh et al. | | 708/513 |

FOREIGN PATENT DOCUMENTS

DE     32 28 018 A1    2/1983

* cited by examiner

*Primary Examiner*—David H Malzahn
(74) *Attorney, Agent, or Firm*—Dickstein, Shapiro, LLP.

(57) ABSTRACT

A calculating unit including a number of bit slices which is less than the number of positions of the operand to be processed. Each bit slice has a logic element and a communication bus between the logic element and the plurality of register cells. The register cells are connected in parallel with respect to the slice-internal communication bus and are controlled by a controller so that only one register cell of the plurality of register cells is coupled to the communication bus at a time.

11 Claims, 6 Drawing Sheets

FIG 3A

|      | CTRL 1 | CTRL 2 | CTRL 3 | CTRL 4 |                        |
|------|--------|--------|--------|--------|------------------------|
| DATA | 1      | 0      | 0      | 0      |                        |
| INIT | 0      | 0      | 0      | 0      | precharge/pre-discharge |
| DATA | 0      | 1      | 0      | 0      |                        |
| INIT | 0      | 0      | 0      | 0      | precharge/pre-discharge |
| DATA | 0      | 0      | 1      | 0      |                        |

FIG 6 PRIOR ART

CALCULATING UNIT

CROSS-REFERENCE TO RELATED APPLICATION

This application claims priority from German Patent Application No. 10 2004 013 484.7, which was filed on Mar. 18, 2004, and is incorporated-herein by reference in its entirety.

BACKGROUND OF THE INVENTION

1. Field of the Invention

The present invention relates to calculating units and, in particular, to calculating units for processing an operand having a number of positions, wherein the calculating unit has a number of bit slices equal to an $m^{th}$ part of the number of positions of the operand. In other words, the present invention relates to a calculating unit for processing one or more operands, wherein the calculating unit has less bit slices than the one or more operands.

2. Description of the Related Art

Figure 4:
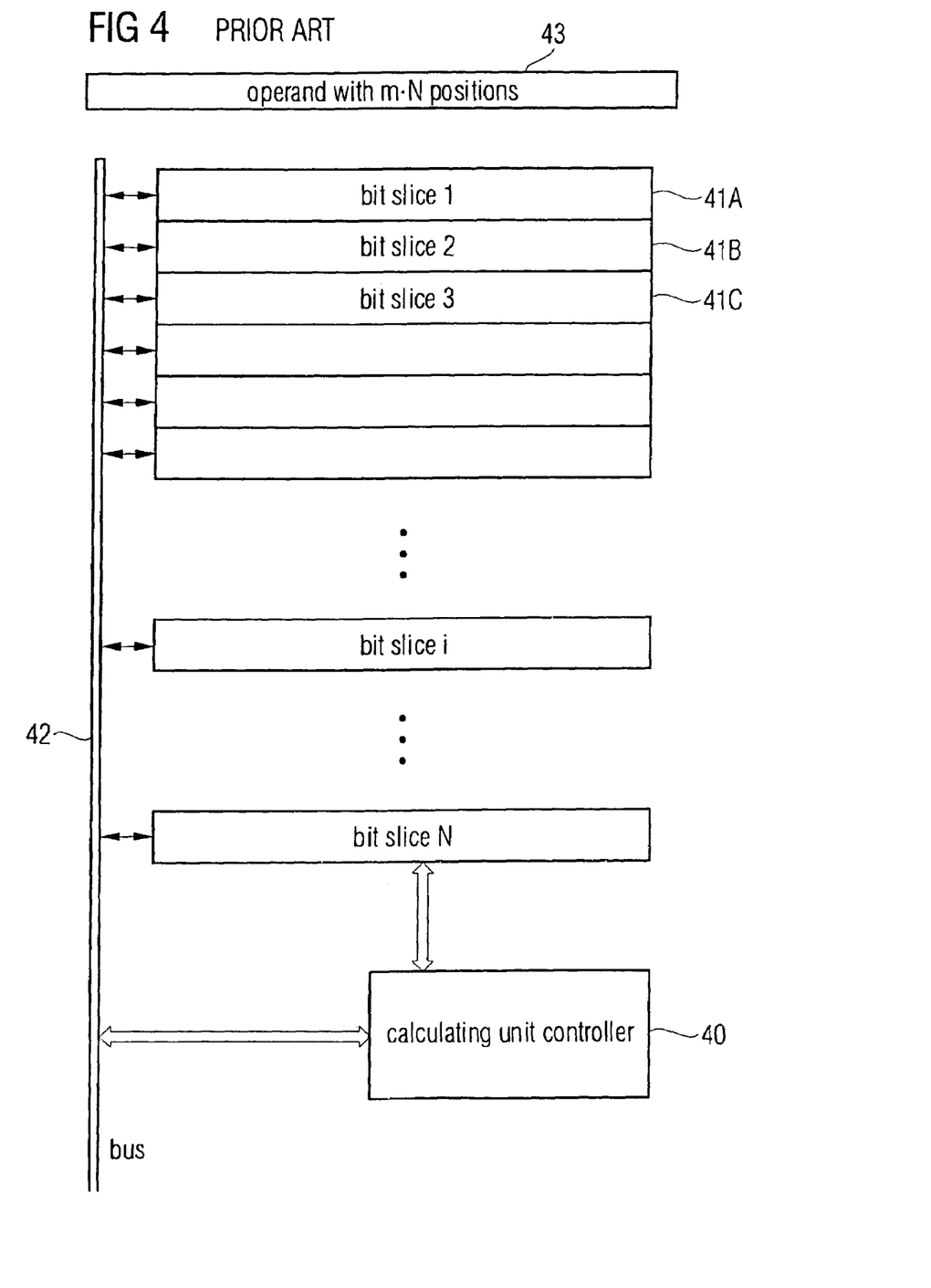
FIG. 4 is a schematic diagram of a calculating unit composed of N bit slices.

FIG. 4 shows a known calculating unit. The calculating unit includes a calculating unit controller 40 and a plurality of bit slices 41a, 41b, 41c, wherein a total of N bit slices and/or bit slice means is illustrated in FIG. 4. The calculating unit shown in sections in FIG. 4 further includes an external calculating unit bus 42 designed to load data into each bit slice. In the embodiment, also data passed from one bit slice into the next bit slice, i.e. for example carry bits, may be transmitted from one bit slice to the next higher bit slice via slice-internal communication lines. Alternatively, however, this may also be done via the external bus 42.

Only schematically, FIG. 4 shows an operand 43 which has a number of m times N positions, i.e. whose number of positions is greater than the number N of bit slices at the beginning. In the special case shown in FIG. 4, the factor m is greater than or equal to 2, so that the number of positions of the operand 43 is equal to twice, three times, four times, ..., M times the number of bit slices N of the calculating unit shown in FIG. 4.

Figure 5:
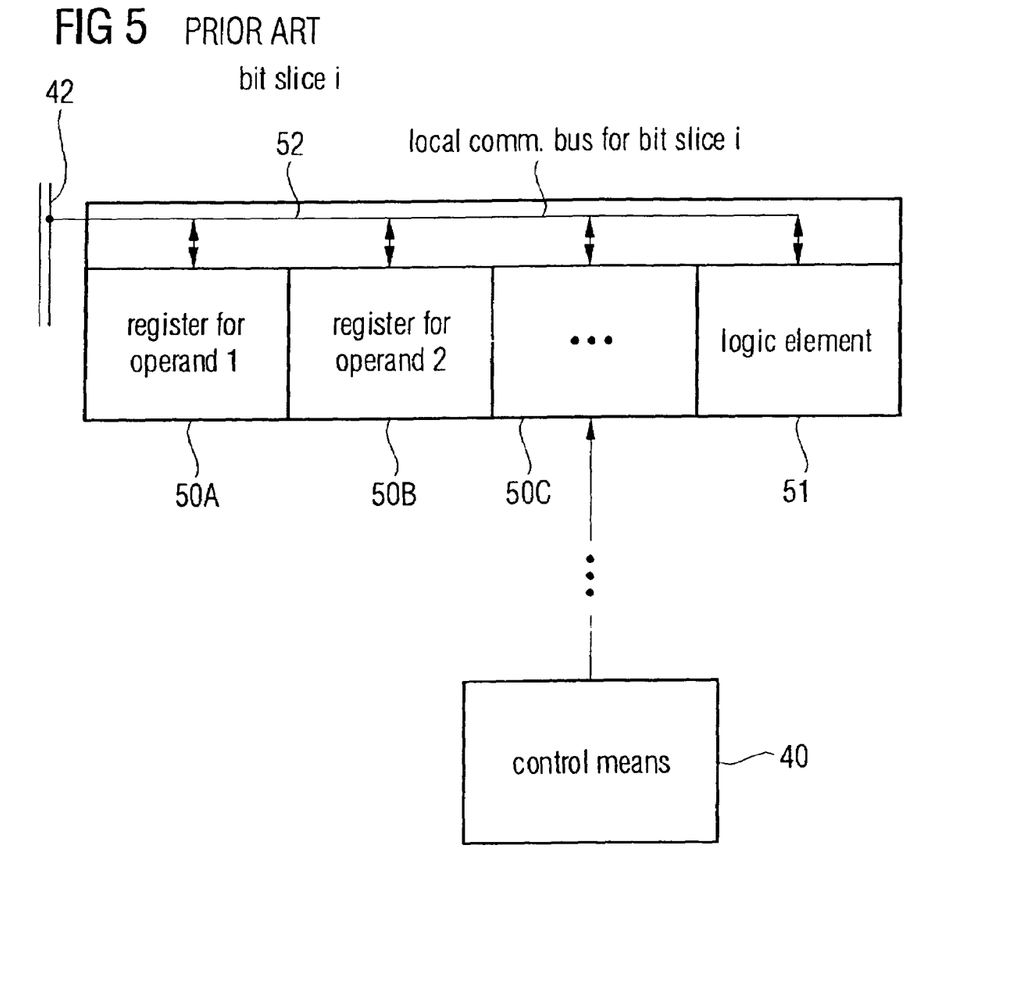
FIG. 5 is a detailed illustration of a bit slice i of FIG. 4.

FIG. 5 shows a more detailed illustration of the bit slice i of FIG. 4. In the embodiment shown in FIG. 5, the calculating unit is designed to process a number k of operands, wherein FIG. 5 shows only the register area 50a for the first operand and the register area 50b for the second operand for the bit slice i. Further register areas for further operands are indicated at 50c.

A bit slice further includes a logic element 51 typically consisting of a number of logic gates to create an adder cell for adding a plurality of operands, particularly in long number calculating units. For this, the logic element includes the gates, necessary for an adder, for generating a sum bit and a carry bit from the two input operand bits and a carry bit from the next lower bit slice, i.e. from the bit slice with the ordinal number i-1. For a more detailed description of bit slices and the way they are stacked one over the other to obtain a calculating unit, see DE 3631992 C1.

The elements 50a, 50b, 50c, 51 of a bit slice i are connected to each other via a local communication bus for the bit slice i, denoted 52 in FIG. 5. Specifically, each register unit includes a connection to the communication bus 52, wherein the communication bus 52 may extend to the external bus 42 or may be connected to the external bus 42 via slice on/off circuits. In FIG. 5, the bit slice i is further shown controllable via the control means 40, already illustrated with respect to FIG. 4.

As discussed above, the calculating unit shown in FIG. 4 serves for processing an operand or several operands. If only one operand is processed, this could, for example, be an inversion of the operand etc. Typically, however, two or more operands are processed with each other, such as two operands when there is simply an addition, or such as three operands which are added to implement an efficient execution of the modular exponentiation, particularly for cryptographic applications such as the RSA cryptosystem, as disclosed in DE 3631992 C2. In this case, the logic element 51 of FIG. 5 consists of a bitwise three operand adder consisting of a half adder and a downstream full adder for each bit slice.

If the length of the calculating unit, i.e. the number of bit slices N, is greater than or equal to the number of positions of the operand, the operand is typically loaded into the corresponding calculating unit register cells via the external bus 42 in an input cycle. This means that the least significant bit is fed into a register cell of the bit slice 41a, that the next higher bit is fed into the bit slice 41b, that again the next higher bit is fed into the bit slice 41c, and that the $i^{th}$ bit is fed into the bit slice i.

If the operand does not have more positions, i.e. if the number of positions of the operand is less than or equal to the number of bit slices, an operation may be performed in a cycle, wherein the result of the operation may be stored in a distinct result register of a bit slice or in the register in which the original value had been, if the original value is no longer needed. The result of the operation may then be output for the external bus 42 of FIG. 4, and may, for example, be stored in an external memory. Depending on the request, however, the result may be used again to be supplied to the logic elements again in a next calculating step via the respective local communication busses of the bit slices, in order to perform a new calculation again. This control is performed by the calculating unit control means 40 which is in operative connection to each bit slice to perform corresponding register loading functionalities.

In the above embodiments, each register block 50a, 50b, 50c was assumed to have exactly one single register cell. If for example, in such a calculating unit in which each bit slice has a register cell for each operand, an addition of two operands was performed which both have more positions than there are bit slices, first a first subgroup of positions of the operand would be fed into the adder via the external bus to calculate the first lower positions of the result. These would then be output, wherein the carry of the highest bit slice is stored. Then the next portion of positions would be fed into the bit slice register cells via the external bus to then calculate the next portion of sum bits using the carry bit just stored for the lowest bit slice. This procedure may be repeated until all positions of the operand have been processed.

This procedure is disadvantageous particularly in that data have to be transmitted via the external bus after each calculating unit cycle.

Figure 6:
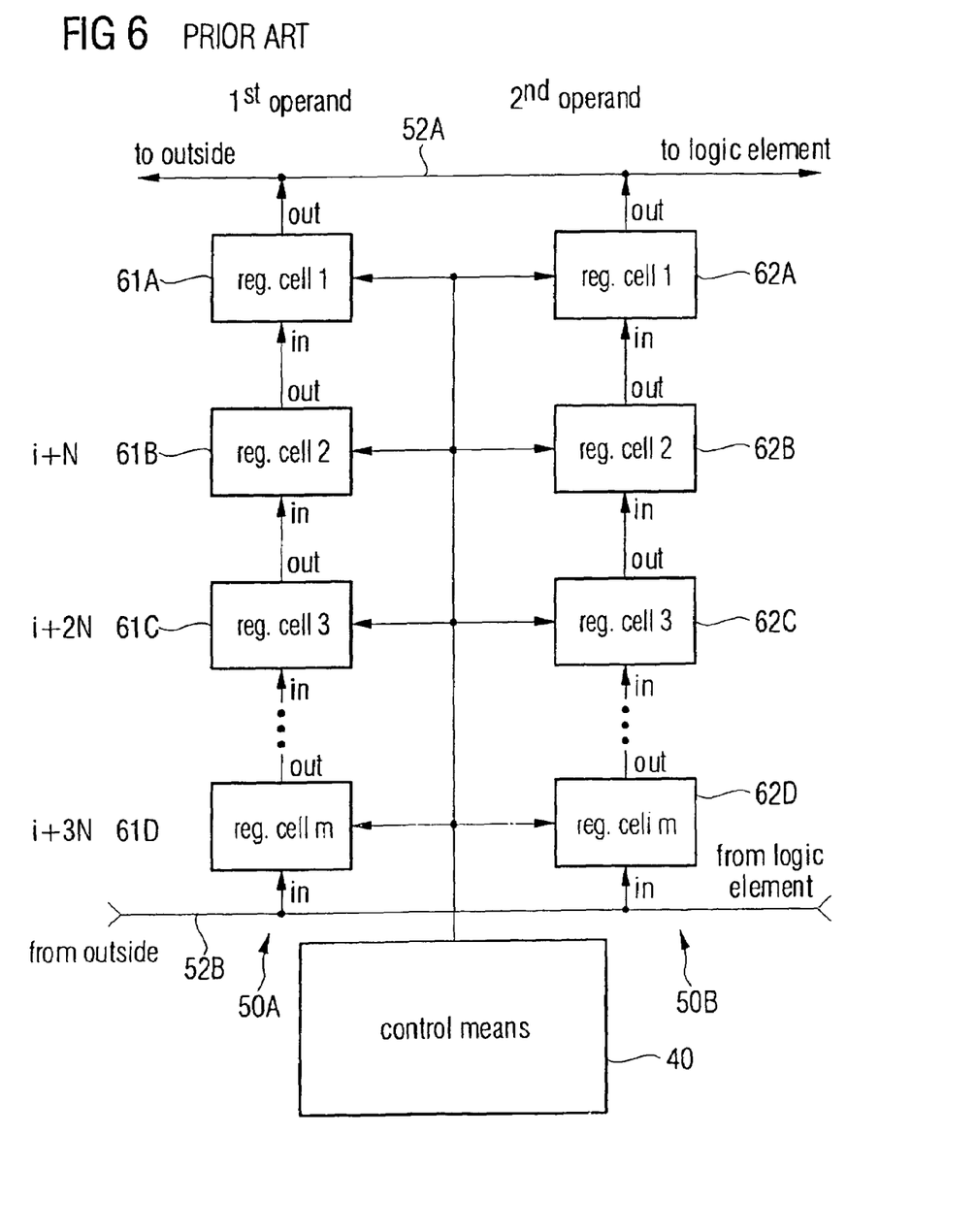
FIG. 6 is a known implementation of a bit slice i with a number of m register cells connected in series.

To overcome this disadvantage, the concept described in FIG. 6 was used, in which each bit slice has a plurality of register cells, in particular m register cells. In particular, FIG. 6 shows the register section of a bit slice i of FIG. 5, i.e. an enlarged illustration of the blocks 50a, 50b including control means 40 and communication bus 52. In the example shown in FIG. 6, the communication bus 52 includes an out communication bus 52a and a back communication bus 52b. Specifically, each register block 50a, 50b now includes a plurality of M register cells 61a-61d connected in series with respect to register block 50a and a plurality of m register cells. 62a, 62b, 62c, 62d connected in series with respect to the register block 50b. The register cells 61a, 61b therefore are connected in series, as shown in FIG. 6, such that the output of one register cell is connected to an input of the next register cell.

For latching data into the register cells, the data storage is performed via the input bus internal to the calculating unit so that first the $i^{th}$ bit of a certain operand which is fed into the register block 50a is supplied to the register cell 61d. For the following, the calculating unit is assumed to have N bit slices. In a next step, the operand N+i is then supplied from the external bus to the input bus 52b. This operand for the position N+i is now fed into the register cell 61d, wherein now, however, the operand for the position i up to now stored in the register cell m is passed on "upwards" into the register cell 3.

For latching in the next bit for the position i+2N, this bit is again supplied from outside and supplied to the register cell m 61d. First, however, the current value stored in the register cell m is passed on to the higher register cell 3. Prior to this, however, the value in the register cell 3 is shifted up into the registration 2.

Latching in the position i+3N of the operand is performed as follows. The value currently stored in the register cell 61b is shifted up into the register cell 61a. The value currently stored in the register cell 61c is shifted up into the register cell 61b. The value currently stored in the register cell 61d is shifted up into the register cell 61c. Finally, the new value for the position i+3N to be latched in is inserted into the register cell m.

A corresponding procedure occurs when values that have been calculated as intermediate result of the last step are supplied from the logic element i via the bus 52b. They are again fed "from bottom to top" into the serially connected register cells. Accordingly, when register cell contents are to be transported, for example, to the logic element or to the external bus, i.e. "out", via the output bus 52a, this is done sequentially.

This procedure is particularly advantageous when the number of register cells is relatively large, i.e., in particular, greater than 2 or 3. This means that very large numbers may be processed with relatively small calculating units. Specifically, consider the exemplary case that operands of a size of up to 1,120 bits are to be processed and that the calculating unit has N=280 bit slices. In such a case, each register block in the bit slice has four register cells connected serially one after the other.

The loading may be performed serially in a distinct loading cycle, while other bits are already processed in the logic element. On the other hand, it is necessary that, to achieve fast operation, new bits are written to all register cells substantially at the same time. In other words, this means that at one time all inputs/outputs of all register cells are opened, as it were, so that the "shifting" of the register cell contents may be performed.

The register bits are typically realized as latches, wherein, for each of the number of m subcycles necessary to process an addition, the concerned register bit is stored in a buffer and all remaining m−1 bits are passed on successively through the sequentially arranged latches, as discussed with respect to FIG. 6. Due to the fact that latching is required (typically somewhere on the path of the output bus 52a or on the path of the input bus 52b), this implementation is problematic, particularly with respect to timing. Furthermore, controlling is complex which represents a problem particularly in that only hardwired control options may be used within the bit slices.

A further disadvantage of considerable importance is the fact that significant cross currents are generated when the register cells are operated in the described sequential way. Particularly in CMOS circuits, which are typically used, no or little cross current is generated in the holding state, i.e. when there is no change of a register. However, if a register changes its state, noticeable cross currents are generated which have to be produced by a chip-internal current source. As mentioned above, in the worst case all m register cells of the circuit topology shown in FIG. 6 may change their states. This means that a current supply of a chip has to produce a significant current equal to the sum of all cross currents. Since typical current supplies are implemented via a voltage source with a corresponding voltage regulator, an extraordinarily strong voltage regulation is required for this case of high cross currents. If it is not provided, a voltage drop will occur on the chip. However, such a generously designed voltage regulator which is able to counteract such a voltage drop requires a lot of chip area on the one hand and is more complex in its design as compared to simpler voltage regulators on the other hand.

In summary, the concept shown in FIG. 6 thus results in a more expensive chip, because additional chip area is required in view of control and its complexity, and because expensive voltage regulators are also required on the chip in view of the high cross currents which may potentially occur.

Particularly in the case of mass applications, such as chips for chip cards, even minor price differences may have the consequence that one product survives, while another product does not achieve market acceptance, due to the large produced numbers.

SUMMARY OF THE INVENTION

It is an object of the present invention to provide a simpler and thus lower priced calculating unit.

The present invention provides a calculating unit for processing an operand having a number of positions, having a number of bit slices, wherein the number of bit slices is less than the number of positions of the operand, wherein a bit slice has a logic element and a plurality of register cells, wherein a communication bus is provided between the plurality of register cells and the logic element, wherein each of the plurality of register cells is coupled to the communication bus so that the plurality of register cells is connected in parallel with respect to the communication bus; and a controller for controlling the plurality of register cells so that only one of the register cells is coupled to the communication bus to transmit a stored position of the operand to the logic element via the communication bus, or to transmit a position to be stored from the logic element to the register cell, wherein the other register cells are decoupled from the communication bus.

The present invention is based on the finding that the problem of complex control and particularly the high cross currents may be tackled if the m register cells in a bit slice are no longer connected in series one after the other, as in prior art, but are connected in parallel. This means that each register cell has a coupling to the slice-internal local communication bus and is selectively controllable such that this register cell may be opened for reading or writing, while all other register cells are closed. Thus, when a bit stored in the register cell is transported to a logic unit, a cross current will occur that corresponds to the cross current when a single register cell changes its contents. This represents a considerable improvement as compared to prior art where potentially m times this cross current could occur. Furthermore, the control is simple as only a "1 from M" coding needs to be used to open a register cell, i.e. to connect it to the communication bus, while the other register cells are maintained closed.

The present invention is further advantageous in that a dual rail implementation with initialization clock between two useful clocks, i.e. with precharge and/or pre-discharge, may readily be used. In this case, the communication bus has a bus line for data and another bus line for negated data. Due to the parallel arrangement of the register cells with respect to the data busses, this bus-related dual rail architecture is readily implementable, namely simply by an input switch and an output switch for a register cell.

In contrast to the data clock, in which there is always one register cell connected to the communication bus, while all other register cells are functionally separated from the communication bus, in the initialization clock all register cells are functionally separated from the communication bus.

Depending on the implementation, however, dual rail registers may be used as well which may also be initialized to allow optimum security against side channel attacks.

In the implementation, the same data bus may readily be used as input bus and as output bus. If, however, a separate input bus or a separate output bus are required, this may also readily be done, because only a corresponding number of input/output switches have to be provided for the individual registers.

The inventive concept is thus based on the parallel connection of the m latches of a bit slice to a local bus of the bit slice. Depending on the task of the register, one bus is sufficient for reading and writing or two busses must be implemented.

This results in the advantage of easy control, because only a single register must be opened at any time. As it is not necessary to pass on the register bits, only miniscule cross currents are generated. Instead of the sequential configuration described at the beginning, the invention chooses a parallel connection of the register cells in view of the immunity against side channel attacks.

BRIEF DESCRIPTION OF THE DRAWINGS

Preferred embodiments of the present invention will be explained in more detail in the following with respect to the accompanying drawings, in which.

DESCRIPTION OF THE PREFERRED EMBODIMENTS

Figure 1:
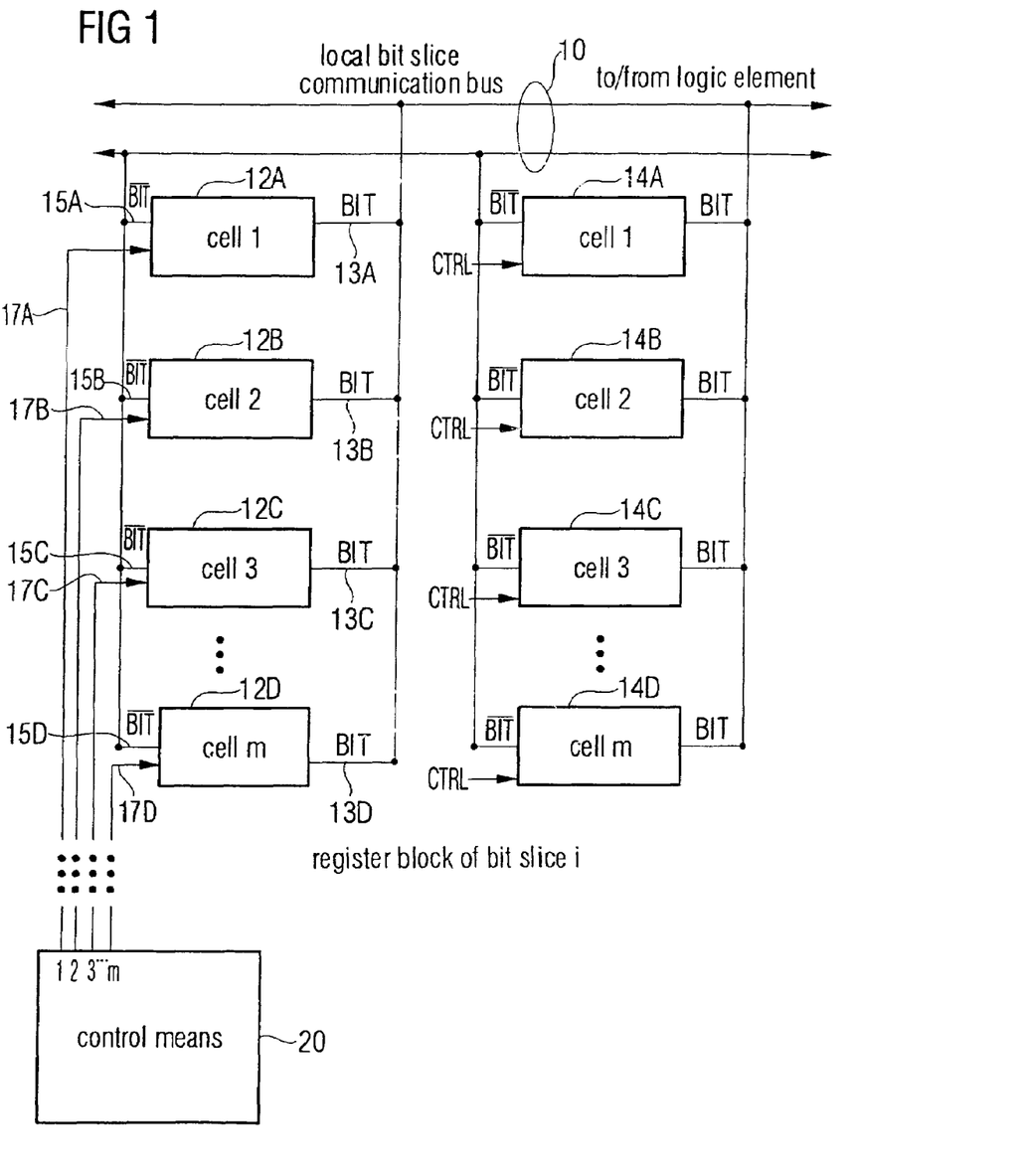
FIG. 1 is a schematic illustration of the register block of a bit slice i according to the present invention.

FIG. 1 shows a schematic illustration of two register blocks of an inventive calculating unit for processing at least one and preferably several operands, wherein each operand has a number of positions. The inventive calculating unit is a calculating unit of the bit slice architecture type, as illustrated with respect to FIG. 4. The inventive calculating unit thus includes a number of bit slices 41a, 41b, 41c (FIG. 4), wherein the number of bit slices is smaller than the number of positions of the at least one operand.

Each bit slice of the calculating unit, in turn, includes a logic element 51 (FIG. 5), as in the case of the known calculating unit shown with respect to FIG. 4. The bit slice i of the inventive calculating unit, illustrated in FIG. 1, further includes a local bit slice communication bus 10 and, for each register block, a plurality of register cells 12a, 12b, 12c, 12d for the left register block or 14a, 14b, 14c, 14d for the right register block of FIG. 1. As can be seen from FIG. 1, the register cells 12a, 12b, 12c, 12d are coupled to the communication bus 10 so that the register cells are connected in parallel with respect to the communication bus for a register block. In particular, each cell in FIG. 1 has a bit output 13a, 13b, 13c, 13d via which the bit stored in the respective cell may be output to the communication bus 10. Preferably, each cell also includes an output for the respective negated bit 15a, 15b, 15c, 15d.

According to the invention, each register cell is further controllable via a distinct control line 17a, 17b, 17c, 17d in that it is separated from the communication bus 10 or that it is coupled to the communication bus 10 for the purpose of reading or writing.

The control lines 17a-17d are controlled via control means 20 arranged somewhere on the chip such that always the correct cell is connected to the bus 10. The control means 20 is thus provided to control the plurality of register cells so that only one of the register cells is coupled to the communication bus to transmit a stored position of the operand to the logic element via the communication bus or to obtain a position from the logic element for the purpose of storing it in the register cell, wherein the other register cells remain decoupled from the communication bus.

Preferably, the number of cells in a register block of a bit slice i for an operand equals m, wherein the operand to be processed has a number of m times N positions, wherein N is the number of bit slices of the calculating unit. It is, however, easily appreciated that the inventive concept also functions when the number of positions of the operand a=m times N, because particularly for adder calculating units, it is of no importance whether a certain number of bit slices which would actually be provided for higher bits than the most significant bit of the operand are, so to speak, "idle". In other words, these bit slices may either be deactivated or simply provided with zeros to de facto "neutralize" the corresponding bit slices.

In the embodiment shown in FIG. 1, each register cell includes two outputs, namely an output for the bit 13a, for example, and an output for the negated bit 15a, for example. This implementation is particularly favorable for an application of the dual rail concept to the slice-internal local communication bus. For this purpose, a detailed illustration of the register cells is given with respect to FIG. 2. In a preferred embodiment of the present invention, a register cell includes two negative feedback inverters 22a, 22b and 24a, 24b, respectively, for the cell 112a and the cell 212b, respectively, of FIG. 1. The control line 17a, for example for the cell 1, is designed to actuate two switches, wherein one switch is designed to couple the cell to the line 13d for a data bit (switch 26a), and wherein the other switch is designed to couple the memory cell to the line 15d for the negated bit (26b). Corresponding switches 28a, 28b exist for the second cell 12b. In the preferred embodiment, the switches 26a, 26b, 28a, 28b represent a conductive connection when a positive voltage pulse is applied to the corresponding control line 17a and 17b, respectively, while in the case where no voltage is applied to the control line, the switches 26a, 26b, 28a, 28b represent an open circuit such that the register cell is decoupled from the bus 13d and 15d, respectively.

Figure 2:
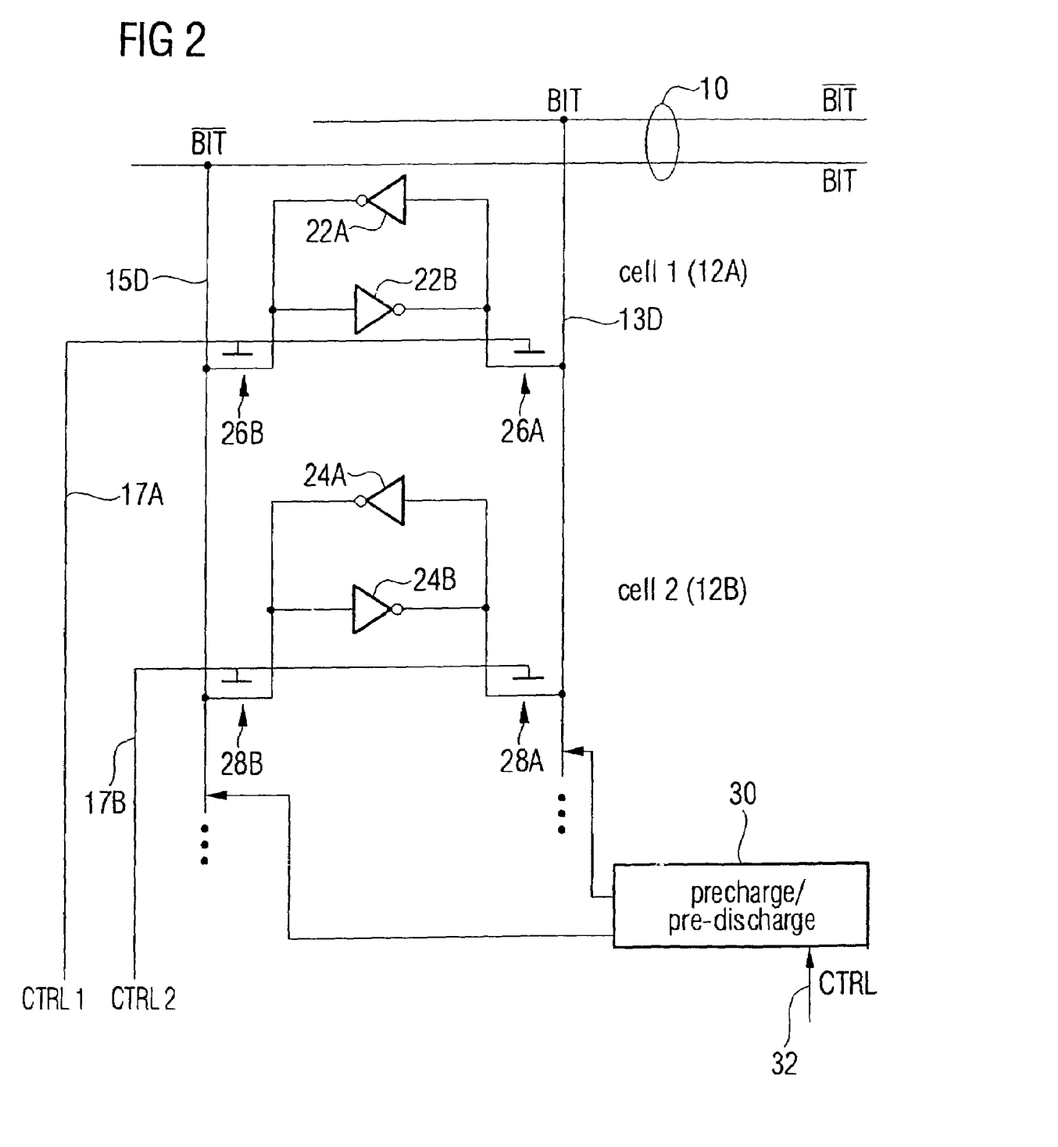
FIG. 2 is a detailed illustration of two register cells of FIG. 1.

As shown in FIG. 2, the bus lines 13d, 15d are further coupled to an initialization means 30 designed to perform a precharge operation or a pre-discharge operation when an initialization clock is signaled by a control line 32. This means that, in precharge operation, both lines 13d, 15d are brought to a high voltage state. Pre-discharge operation means that both lines 13d, 15d are brought to a low voltage state. The precharge operation and the pre-discharge, respectively, always occur between two data clocks so that a data clock is followed by an initialization clock. This ensures that, regardless of whether actual data states change or not, there is always exactly one change from one clock to the next on the bus lines 13d, 15d, so that the same current profile is generated independent of the data transmitted via the bus 13d, 15d.

Figure 3A:
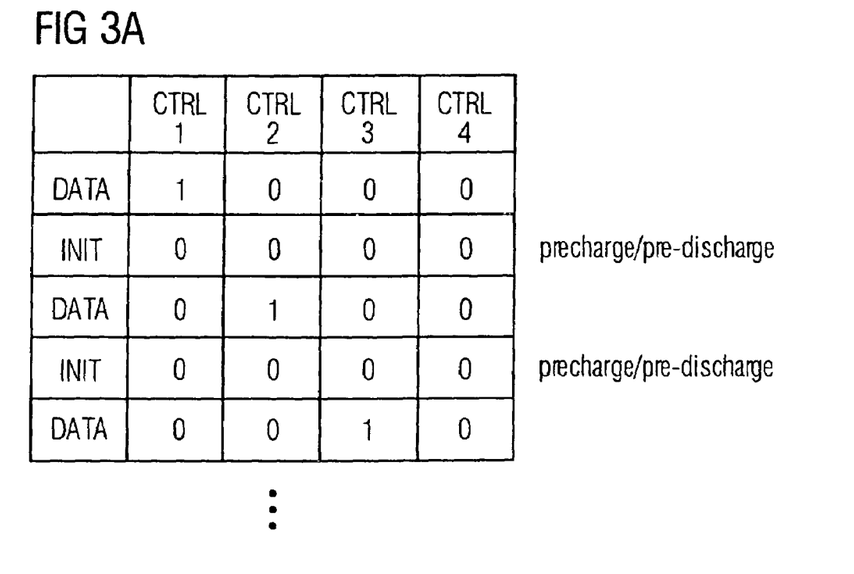
FIG. 3a is an overview illustration of the "1 from M" coding for controlling the register cells with inserted initialization clocks.

This operation is schematically illustrated in the table shown in FIG. 3. A further element to be seen in the table shown in FIG. 3 is the one hot coding which is used among the control lines when there is a data clock. In the first clock, only the control line 1 is high, which means that the cell 112a of FIG. 1 is connected to the bus to get data from the cell to the logic element or to get data from the logic element into the cell. The control lines 2, 3 and 4, however, are provided with a zero so that the corresponding memory cells 12b, 12c, 12d are decoupled from the local communication bus. An initialization clock follows in which both bus lines, i.e. the bus line for the bit and the bus line for the inverted bit, are brought to the same state by the initialization means 30 of FIG. 2. A data clock follows then in which now only the contents of the second register cell are brought to the logic element and/or a date provided by the logic element is fed into the register cell 2, but into no other cell. Next is again an initialization clock etc.

It is to be noted that, in the embodiment shown in FIG. 1, a distinct conductor line is implemented from the control means 20 to each cell. However, there could also be provided only one single line connected to each cell. In this case, decoding would have to take place within a cell, for example in the form of a multiplexer, to interpret the signal on the control line to find out whether a currently considered register cell is to be connected to the bus or not. However, due to the simplicity of the implementation, it is preferred to have a distinct control line for each register cell.

While, in FIG. 1, a dual rail implementation is shown in which each cell has both a bit connection and a connection for the negated bit, a single rail implementation would also be possible. In this case, there would be no connections 15a, 15b, 15c, 15d and no respective bus line of the bus 10. However, the dual rail implementation may readily be used for the latches shown in FIG. 2, because due to their construction, the latches provide both the data bit and the negated data bit without any further effort in terms of circuit engineering.

While, in FIGS. 1 and 2, an implementation is shown in which the local bit slice communication bus 10 is shown both for transmitting data to the logic element and for transmitting data from the logic element, there are also other implementations in which a distinct bus is provided for transmitting data to the logic element and a distinct bus is provided for transmitting data from the logic element to the register cell. In this case, each register cell would have an additional output for the non-negated bit and an additional output for the negated bit, wherein these two additional outputs are provided for a further communication bus to implement the required two path functionality on two different busses.

While the above embodiments have described that, in the initialization clock effected by the precharge/pre-discharge means 30 in FIG. 2, all memory cells are disconnected, this dual rail concept with initialization may readily be extended to a register dual rail concept. As can be seen from FIG. 2, it is generally not possible to bring the memory cell 1, for example on both sides, i.e. on the left side 15d and the right side 13d, to the same state. This is because the two inverters 22a, 22b are inversely connected and only have a stable possible state when there is a different state left and right to the inverters.

Therefore a decoupling of all memory cells is performed in the concept shown in FIG. 2 in dual rail operation, so that the dual rail concept is only implemented for the local bit slice communication bus. However, for a still secure operation, the dual rail operation with initialization could be applied to a register cell even when it is required to write to a register, i.e. when data are transmitted back from the logic element to the register cell. In this case, the register cell 1 shown in FIG. 2 would, for example, be extended by a further pair of coupled inverters connected in parallel.

Figure 3B:
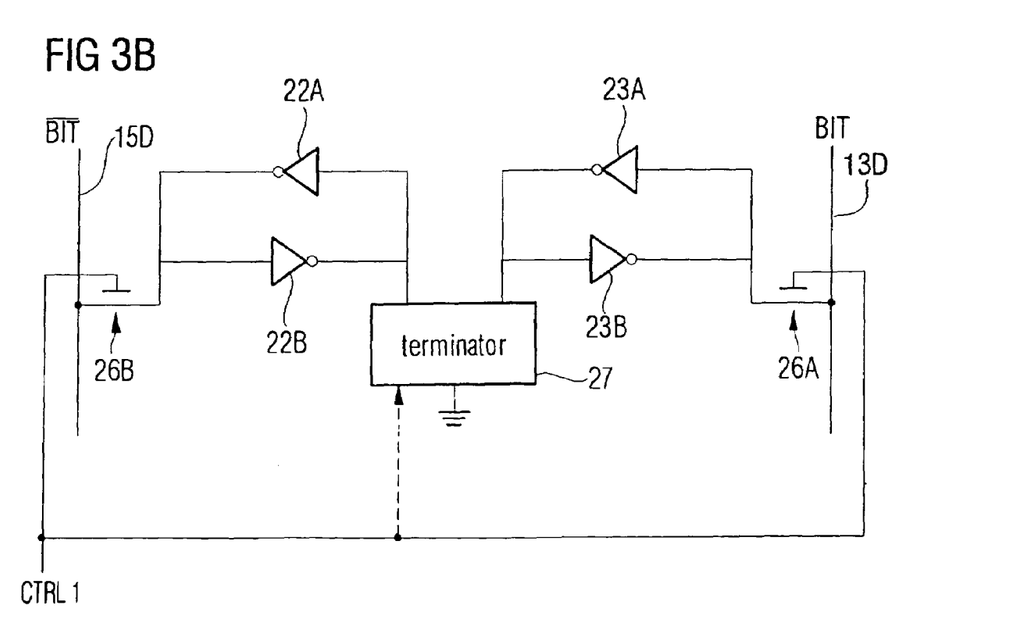
FIG. 3b shows a register cell in dual rail technology.

This register operable in dual rail operation is schematically illustrated in FIG. 3b. It is characterized in that it has substantially two pairs of negative feedback inverters, namely 22a, 22b and 23a, 23b. Both inverters are connected via a terminating means and/or a controllable terminator 27. The controllable terminator 27 is designed to substantially separate the right side of the inverter pair 22a, 22b from the left side of the inverter pair 23a, 23b, so that an initialization may be performed not only on the bus lines 15d, 13d, but also in the register cell itself. In the circuit shown in FIG. 3b, it is now possible to maintain the two switches 26a, 26b open also in the initialization clock, so that the left side of the inverter pair 22a, 22b as well as the right side of the inverter pair 23a, 23b are initialized to the same voltage state. This is useful when data are written back from the logic element to a register cell. It ensures that, independent of the data which are written to the register cell, i.e. regardless of whether the state of the register cell is changed or not, there is always a change in the left inverter pair 22a, 22b or in the right inverter pair 23a, 23b, so that even side channel attacks directly on the register itself will fail. In this case, the terminating means 27 is designed to achieve a potential separation between the two inverter pairs, wherein this potential separation is only important when the register pairs are in precharge and/or pre-discharge operation. If the register cell of FIG. 3 is in normal operation, the terminating means may maintain a potential connection, although it does not have to.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A calculating unit for processing an operand having a number of positions, comprising:

a number of bit slices, wherein the number of bit slices is less than the number of positions of the operand, wherein a bit slice has a logic element and a plurality of register cells, wherein a communication bus is provided between the plurality of register cells and the logic element, wherein each of the plurality of register cells is coupled to the communication bus so that the plurality of register cells is connected in parallel with respect to the communication bus; and a controller for controlling the plurality of register cells so that only one of the register cells is coupled to the communication bus to transmit a content of a position of the operand to the logic element via the communication bus, or to transmit a content of a position to be stored from the logic element to the register cell, wherein the other register cells are decoupled from the communication bus.

2. The calculating unit of claim 1, wherein the number of bit slices of the calculating unit is equal to an $m^{th}$ part of the positions of the operand, wherein m is greater than or equal to 2.

3. The calculating unit of claim 1, wherein the controller is further designed to store an output of the logic element into the same register cell from which an input for calculating the output was transmitted to the logic element via the communication bus.

4. The calculating unit of claim 1, wherein at least one register cells is designed as latch, which comprises a first input for a bit and a second input for a negated bit.

5. The calculating unit of claim 4, wherein the communication bus comprises a first bus line connected to the first input via a first switch, and a second bus line connected to the second input via a second switch, and
wherein the controller is designed to close the first and the second switch of only one register cell at a time, wherein the first switch and the second switch of the other register cells in the bit slice are open.

6. The calculating unit of claim 5, designed for an initialization operation with precharge or pre-discharge, wherein the controller further comprises an initialization unit designed to open all first and second switches of the register cells in the bit slice in an initialization clock, and wherein, in the initialization clock, both the first bus line and the second bus line are brought to the same voltage state.

7. The calculating unit of claim 1,
wherein the calculating unit is designed for processing a plurality of operands,
wherein a bit slice comprises a number of register cells for each of the operands, and
wherein a distinct communication bus is provided for each operand, wherein the register cells for an operand are connected in parallel with respect to the communication bus for the operand.

8. The calculating unit of claim 1, wherein the calculating unit has N bit slices, and
wherein the controller is designed to load the register cells of an $i^{th}$ bit slice so that an $i^{th}$ position of the operand is stored in the first register cell,
an $(i+N)^{th}$ position of the operand is stored in the second register cell, and
wherein the controller is designed to first process the positions of the operand stored in the respective first register cells in all N bit slices and then process the positions of the operand stored in the respective second register cells in all N bit slices, for processing the operand.

9. The calculating unit of claim 1, wherein a number of bit slices greater than or equal to 140, and the number of positions of the operand is greater than or equal to 280.

10. The calculating unit of claim 1, designed for processing a plurality of operands, wherein the communication bus comprises a plurality of decentralized bus lines, wherein each decentralized bus line is provided for the plurality of register cells of an operand, and
wherein the communication bus comprises a central bus line to which each of the decentralized bus lines is connected.

11. The calculating unit of claim 1, wherein the controller comprises m control lines for each operand, wherein each control line is coupled to a distinct register cell of the plurality of register cells, and wherein only one of the control lines has a first state at a time, and all other control lines have a second state differing from the first state.

\* \* \* \* \*